United States Patent [19]
Suzuki et al.

[11] Patent Number: 6,104,124
[45] Date of Patent: Aug. 15, 2000

[54] ULTRASONIC MOTOR AND ELECTRONIC APPARATUS AND ANALOG TIMEPIECE HAVING THE ULTRASONIC MOTOR

[75] Inventors: Kenji Suzuki; Akihiro Iino; Masao Kasuga; Makoto Suzuki; Takashi Yamanaka, all of Chiba, Japan

[73] Assignee: Seiko Instruments Inc., Japan

[21] Appl. No.: 09/127,098

[22] Filed: Jul. 31, 1998

[30] Foreign Application Priority Data

Aug. 1, 1997 [JP] Japan .................................. 9-208050

[51] Int. Cl.⁷ .................................................. H01L 41/08
[52] U.S. Cl. ......................................................... 310/323.4
[58] Field of Search .............................. 310/328, 323.06, 310/323.03, 323.05, 323.09, 323.04

[56] References Cited

U.S. PATENT DOCUMENTS

| | | | |
|---|---|---|---|
| 5,079,470 | 1/1992 | Kasuga et al. | 310/323.063 |
| 5,229,678 | 7/1993 | Miyazawa | 310/316 |
| 5,592,041 | 1/1997 | Kasuga et al. | 310/316 |
| 5,619,089 | 4/1997 | Suzuki et al. | 310/316 |
| 5,770,912 | 6/1998 | Suzuki et al. | 310/316 |

FOREIGN PATENT DOCUMENTS

| | | |
|---|---|---|
| 395298 A2 | 10/1990 | European Pat. Off. . |
| 2-070277 | 3/1990 | Japan . |

OTHER PUBLICATIONS

Patent Abstracts of Japan, vol. 096, No. 008 Aug. 30, 1996.

*Primary Examiner*—Nestor Ramirez
*Assistant Examiner*—Peter Medley
*Attorney, Agent, or Firm*—Adams & Wilks

[57] ABSTRACT

An ultrasonic motor has a piezoelectric element driven by application of a voltage thereto to undergo expansion and contraction. A vibrating body is vibrationally driven by the expansion and contraction movement of the piezoelectric element to thereby produce standing waves. A moving body is frictionally driven by the standing waves of the vibrating body. Power transmission projections apply a frictional force to the moving body to thereby frictionally drive the moving body in accordance with the standing waves. The power transmission projections are disposed only every preselected number of wavelengths at intermediate positions between loops and nodes of the standing waves, the preselected number being a natural number.

26 Claims, 10 Drawing Sheets

ULTRASONIC MOTOR AND ELECTRONIC APPARATUS AND ANALOG TIMEPIECE HAVING THE ULTRASONIC MOTOR

BACKGROUND OF THE INVENTION

The present invention relates to respective improvements of an ultrasonic motor that comprises a vibrating body periodically vibrating due to the expansion and contraction vibration of a piezoelectric element to thereby form a standing wave thereon and a power transmission projection provided at an intermediate position between the loop and node of the standing wave of the vibrating body, and to an electronic apparatus and an analog type timepiece each of which uses the ultrasonic motor.

Recently, in the field of a micromotor, attention has been drawn toward an ultrasonic motor which uses a piezoelectric element as a drive source therefor. As the ultrasonic motor there are known a type wherein different resonant modes of a rectangular flat plate-like vibrating body are combined with each other, a type wherein a travelling wave is caused to occur on an annular vibrating body by electric excitations whose phases differ 90° from each other, etc.

Also, from the viewpoint of causing the production of a drive force in the normal and reverse directions by the use of a single power source, there is known a type causing the occurrence of standing waves on a vibrating body (see Japanese Patent Application Laid-Open Publications Nos. Hei 2-287281 and Hei 8-107686).

FIGS. 9A and 9B each illustrate a main part of the standing wave type ultrasonic motor, FIG. 9A illustrating a developed structure of the circumferential surface and FIG. 9B thereof illustrating a planar structure.

A main part of the ultrasonic motor is comprised of a piezoelectric element 11 having divided portions prepared by circumferentially dividing the element 11 into twelve equal sectorial portions, wherein each pair of adjacent divided portions are processed so that each pair may be alternately inverted in the polarization direction, a vibrating body 12 joined to the piezoelectric element 11, power transmission projections 13 each provided on a circumferential surface of the vibrating body 12 at a position corresponding to the boundary between the paired divided portions, and a moving body 24 abutted on the power transmission projections 13.

In order to move the moving body 24, as illustrated in FIG. 9B, a voltage is applied to a group of the divided portions (11a or 11b) of the piezoelectric element 11 which have alternately been disposed to thereby cause the occurrence of standing waves on the vibrating body 12. Here, the power transmission projection 13 is located at an intermediate position between the loop and node of the standing wave occurring on the vibrating body 12 every half-wavelength.

At this time, when each power transmission projection 13 is located on the crest side of the standing wave, a forward end thereof abuts on the moving body 24 to thereby apply a frictional force thereto, and the power transmission projection 13 located at an intermediate position between the trough and node of the standing wave is kept out of contact with the moving body 24. Therefore, the moving body 24 is rotated in one direction.

However, when miniaturizing the ultrasonic motor, the amplitude of the excited standing waves is very small, and respective sliding surfaces of the vibrating body 12 and moving body 24 each have convexities and concavities due to the microscopic undulation and roughness.

FIG. 10 illustrates the surface configurations of the vibrating body and moving body and contacted states of the projections with the surface of the moving body.

Namely, when convexities and concavities exist on the sliding surfaces of the vibrating body 12 and moving body 24, not only the power transmission projections 13a on the crest side of the standing waves but also a part of the ordinarily non-contacted power transmission projections 13b on the trough side of the standing waves is brought into contact with the moving body 24 to thereby apply a frictional force in a direction opposite to the advancing direction of the moving body 24. This becomes the loss of the energy at the time of converting the vibration energy of the vibrating body 12 to the rotating force of the moving body 24, raising the technical problem of impairing the rotation performance of the ultrasonic motor.

Also, while the operation of cutting the surface of the disk-shaped vibrating body 12 into projecting configurations is necessary for producing the power transmission projection 13, since a complex grinding procedure and a significantly large amount of time are necessary for producing a large number of projecting configurations, there exists the problem that the manufacturing process becomes complex.

SUMMARY OF THE INVENTION

It is an object of the present invention to provide an ultrasonic motor, and an electronic apparatus and analog type timepiece each of which uses the ultrasonic motor, wherein the loss of the vibration energy of the vibrating body is prevented with the result that the rotation performance of the ultrasonic motor is enhanced, since it has been arranged that when the power transmission projection is located on the crest side of the standing wave, this projection is pressure contacted with the moving body to thereby apply a frictional force thereto and drive the moving body in the advancing direction and that, on the other hand, at this time, the intermediate position that is located on the trough side of the standing wave of the vibrating body every half-wavelength distance as measured from the power transmission projection is kept out of contact with the moving body so as to apply no frictional force to the moving body in the opposite direction to the advancing direction.

It is another object of the present invention to provide an ultrasonic motor, and an electronic apparatus and analog type timepiece each of which uses the ultrasonic motor wherein the moving body can be moved with a high torque, since it has been arranged that a maximum frictional force is applied to the moving body.

It is another object of the present invention to provide an ultrasonic motor, and an electronic apparatus and analog type timepiece each of which uses the ultrasonic motor wherein a stable drive of the ultrasonic motor is achieved and the variation in the vibration characteristic due to the change in the environment is mitigated, since it has been arranged that the equilibrium with the power transmission projection is achieved to thereby maintain the balanced state of the vibrating body.

It is another object of the present invention to provide an ultrasonic motor, and an electronic apparatus and analog type timepiece each of which uses the ultrasonic motor wherein the loss of the vibration energy of the vibrating body is prevented, since it has been arranged that no frictional force is applied in the opposite direction to the advancing direction.

It is another object of the present invention to provide an ultrasonic motor, and an electronic apparatus and analog type timepiece each of which uses the ultrasonic motor wherein the manufacturing fixture is simplified, since it has been arranged that a minimum number of vibration stabilizing projections are prepared.

It is another object of the present invention to provide an ultrasonic motor, and an electronic apparatus and analog type timepiece each of which uses the ultrasonic motor wherein the moving body is driven stably, since it has been arranged that the moving body is supported two-dimensionally by means of three or more power transmission projections.

It is a further object of the present invention to provide an ultrasonic motor, and an electronic apparatus and analog type timepiece each of which uses the ultrasonic motor wherein the manufacturing process is simplified, since the preparation of the vibration stabilizing projection has been made easy.

DETAILED DESCRIPTION OF THE PREFERRED EMBODIMENTS

Figure 1:
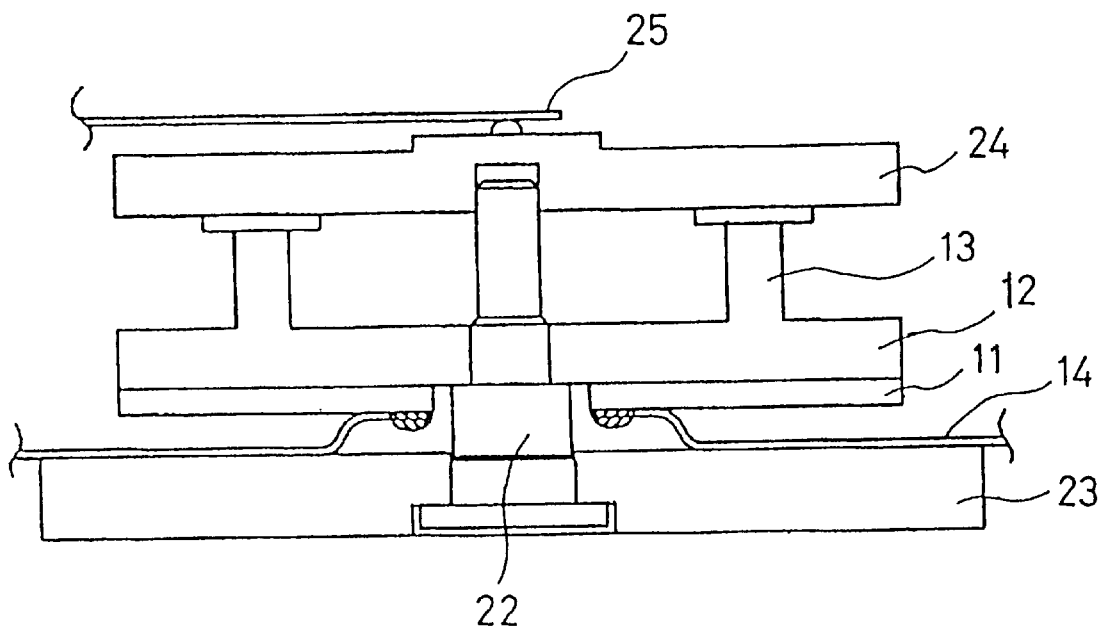
FIG. 1 is an explanatory view illustrating a sectional structure of a first embodiment wherein the present invention has been applied to an ultrasonic motor.
Figure 2:
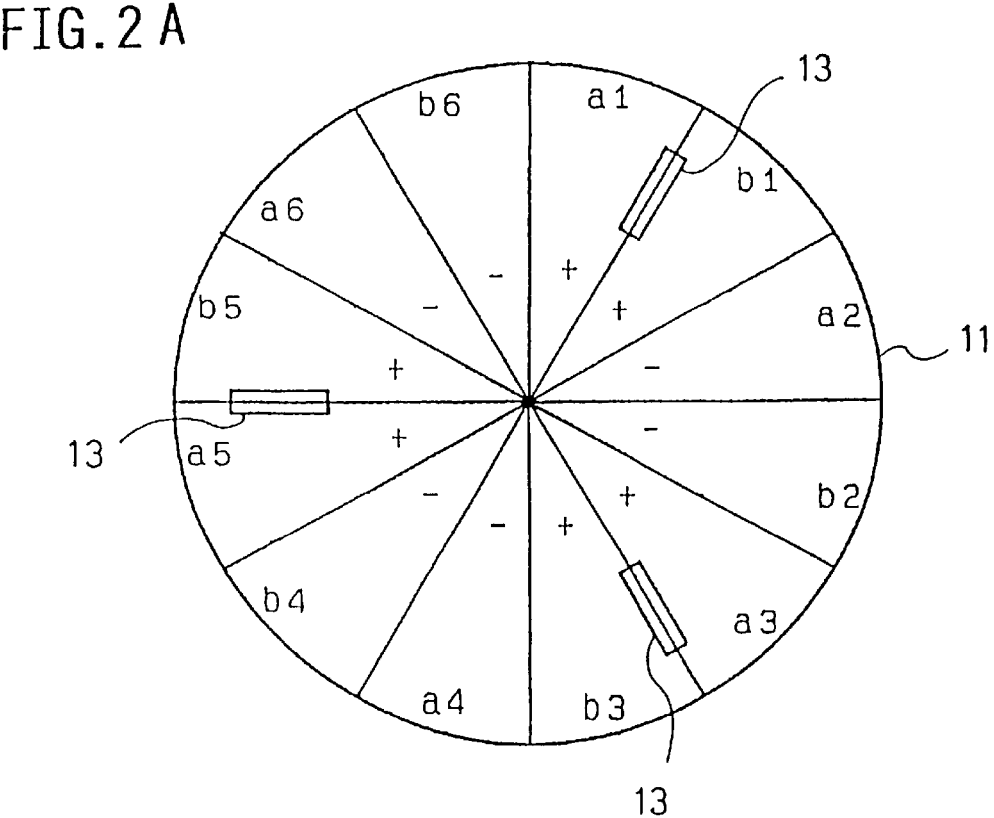
FIG. 2A is an explanatory view illustrating a planar structure of a main part of the ultrasonic motor illustrated in FIG. 1.
FIG. 2B is an explanatory view illustrating a developed structure of a circumferential surface thereof.
Figure 2:
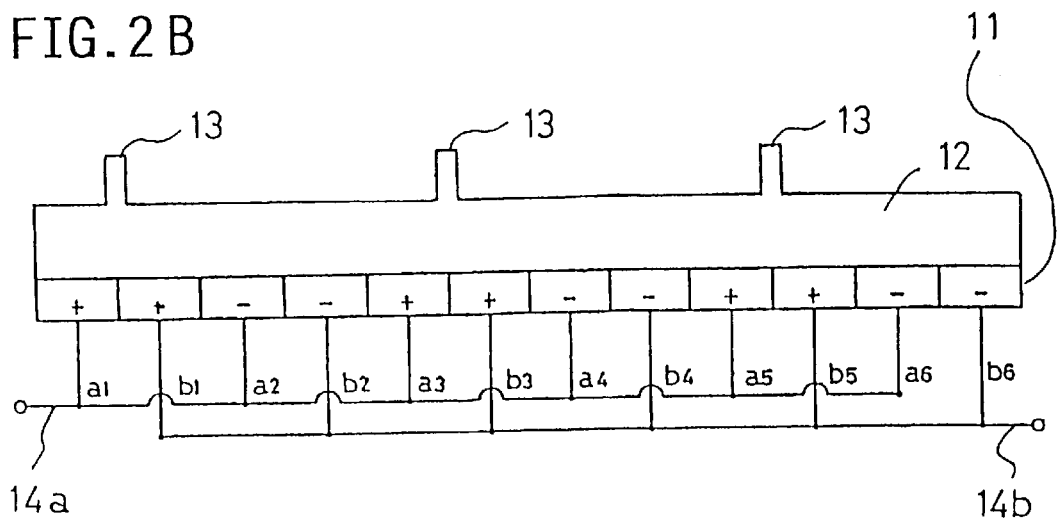

Namely, the invention an embodiment of provides an ultrasonic motor which comprises a vibrating body that periodically vibrates due to the expansion and contraction movement of a piezoelectric element to thereby form standing waves, thereby pressure contacting the standing waves of the vibrating body with a moving body and thereby driving the moving body by a frictional force, and which is characterized by comprising power transmission projections at intermediate positions between the loops and nodes of the standing waves of the vibrating body every n wavelengths (n: a natural number), the power transmission projections being intended to apply the frictional force to the moving body.

As the function of this construction, the vibrating body is vibrated by the expansion and contraction movement of the piezoelectric element, whereby standing waves occur on the vibrating body. When the power transmission projection provided at the intermediate position between the loop and node of the standing wave every n wavelength is located on the crest side of the standing wave, this projection is pressure contacted with the moving body to thereby apply the frictional force to the moving body and thereby drive the moving body in the advancing direction. On the other hand, since no power transmission projection is provided at the intermediate position spaced on the trough side of the standing wave from the power transmission projection every half wavelength distance, even when convexities and concavities exist on the surface of the vibrating body and moving body, this intermediate position is kept out of contact with the moving body. Namely, since it has been arranged that no frictional force is applied to the moving body in the opposite direction to the advancing direction, the moving body receives the frictional force in only the advancing direction, whereby the loss of the vibration energy of the vibrating body is prevented and the rotation performance of the ultrasonic motor is enhanced.

Here, the above-described standing wave includes both a standing wave in single vibration mode and a standing wave prepared by composing a plurality of standing waves each having the same phase.

The power transmission projection includes both a power transmission projection formed integrally with the vibrating body and a power transmission projection formed separately from the vibrating body.

The ultrasonic motor according to the foregoing embodiment is further characterized in that the power transmission projections are provided at intermediate positions between the loops and nodes of the standing waves of the vibrating body every 1 wavelength to thereby apply the frictional force to the moving body.

According to this invention, since a maximum number of the power transmission projections have been disposed to thereby apply a maximum magnitude of frictional force to the moving body, the moving body can be moved with a highest torque while, on the other hand, the intermediate position spaced by a half wavelength from the power transmission projection applies no frictional force to the moving body in the opposite direction to the advancing direction even when convexities and concavities exist on the surface of the vibrating body and moving body.

The ultrasonic motor according to any of the foregoing embodiments is further characterized by comprising vibration stabilizing projections at the intermediate positions that are between each adjacent two of the power transmission projections and that are equally spaced from each other including these adjacent two power transmission projections, the vibration stabilizing projection having a height smaller than that of the power transmission projection and intended to stabilize the vibration of the vibrating body.

Here, the vibration stabilizing projection is located on the trough side of the standing wave and the height thereof is to such an extent as, even when convexities and concavities exist on the surface of the vibrating body and moving body, to be kept out of contact with the moving body.

According to this invention, since it has been arranged that the equilibrium with the power transmission projection is achieved by the vibration stabilizing projection to thereby keep a balanced state of the vibrating body, stable drive of the ultrasonic motor is achieved and the change in the vibration characteristic due to the environmental change is mitigated. Also, since it has been arranged that the vibration stabilizing projection applies no frictional force in the opposite direction to the advancing direction, the loss of the vibration energy of the vibrating body is prevented.

The ultrasonic motor is further characterized in that the vibration stabilizing projection is provided at the intermediate position that is equidistant from and between the power transmission projections.

According to this invention, since it has been arranged that a minimum number of the vibration stabilizing projections are formed, the manufacturing process is simplified.

The ultrasonic motor is further characterized in that the power transmission projections are provided at least three in number.

According to this invention, since it has been arranged that the moving body is two-dimensionally supported by three or more power transmission projections, the moving body is stably driven.

The ultrasonic motor is further characterized in that between each adjacent two of the power transmission projections there is provided the vibration stabilizing projection that continues from one of the power transmission projections to the other thereof.

According to this invention, since the vibration stabilizing projections are made easy to form, the manufacturing process is simplified.

In another embodiment, the invention provides an electronic apparatus which is characterized by comprising the ultrasonic motor according to the foregoing embodiments.

According to this invention, an electronic apparatus which uses the ultrasonic motor as a drive source therefor is realized.

Here, the electronic apparatus include all of those, in the field where a micromotor is applicable, that includes electronic timepieces, measuring instruments, cameras, printers, etc.

In another aspect, the invention provides an analog type timepiece which is characterized by comprising the ultrasonic motor according to the foregoing embodiments.

According to this invention, an analog type timepiece which uses the ultrasonic motor as a drive source therefor is realized.

Embodiments to which the present invention has been applied will now be explained with reference to FIGS. 1 to 8.

{First Embodiment}

FIG. 1 is a sectional view of a first embodiment wherein the present invention has been applied to an ultrasonic motor.

The ultrasonic motor is constructed of a piezoelectric element 11, a vibrating body 12 joined to the piezoelectric element 11, power transmission projections 13 provided on an upper surface of the vibrating body 12, lead wires 14 connected to the piezoelectric element 11, a center shaft 22 passing through the vibrating body 12 at a center thereof, a support plate 23 having the center shaft 22 fixed thereto, a moving body 24 abutted on the power transmission projections 13, and a pressure regulating member, such as pressurizing spring 25, for applying pressure to the moving body 24 at a central portion thereof to contact the moving body 24 with the vibrating body 12 under pressure.

FIGS. 2A and 2B are detailed views illustrating the vibrating body and piezoelectric element of the ultrasonic motor, FIG. 2A illustrating a planar structure and FIG. 2B illustrating a developed structure of the peripheral surface.

As illustrated in FIG. 2A, the piezoelectric element 11 is shaped like a disk. The disk is circumferentially sectorially divided into twelve equal parts a1 - - - a6 and b1 - - - b6. Adjacent divided parts a1 and b1, a2 and b2, - - - or a6 and b6 are made to constitute one set, whereby all the divided parts are each polarized so that all divided parts sets are alternately inverted in polarization direction every one set.

Here, the (+) or (−) which is shown in the figures indicates the polarization direction. The (+) indicates the polarization processing that is executed by applying a positive electric field to joint surfaces of the piezoelectric element and vibrating body 12 from an underside of the piezoelectric element 11, and the (−) indicates the polarization processing that is executed by applying a negative electric field thereto.

Also, on an obverse surface and reverse surface of the piezoelectric element 11 there are formed electrode patterns (not illustrated) each in the shape of a sector that corresponds to a corresponding one of the divided parts a1 - - - a6 and b1 - - - b6.

As illustrated in FIG. 2B, the electrode patterns that correspond to the divided parts a1 - - - a6 at one side are connected to a first lead wire 14a and the electrode patterns that correspond to the divided parts b1 - - - b6 at the other side are connected to a second lead wire 14b.

The vibrating body 12 (not illustrated in FIG. 2A) is shaped like a circular disk that has a size corresponding to the piezoelectric element 1 and is made of elastic material such as an aluminium alloy, stainless steel or brass.

The power transmission projections 13 are each a columnar member that is angular in cross section and that has the same height. The power transmission projections are provided at three positions in total at the respective boundaries between the divided parts sets (a1 and b1, a3 and b3 and a5 and b5) that have been polarization processed to (+)

Here, the reason why such projections are provided at three positions is for the purpose of two-dimensionally supporting the moving body 24 and thereby causing stable rotating movement thereof.

FIGS. 3A and 3B illustrate the positional relationship between the respective power transmission projections and the standing waves that occur on the vibrating body.

As described later, when having formed 3-wavelength standing waves on the circumferential surface of the vibrating body 12 by causing curvature vibration thereof, the respective power transmission projections 13 are disposed at intermediate positions between the loops and the nodes of the standing waves every one wavelength.

Next, the operation of the ultrasonic motor according to this embodiment will be explained.

When rotating the moving body 24 in the positive direction, it is sufficient that as illustrated in FIG. 2B a voltage be applied to the first lead wire 14a.

The divided parts a1 - - - a6 of the piezoelectric element 11 are excited, whereby the vibrating body 12 is curvature vibrated and 3-wavelength standing waves occur on the circumferential surface thereof. Forward ends of the respective power transmission projections 13 make oblique movements followed by vertical movements and lateral movements, and as illustrated in FIG. 3A, when located on the crest side of the standing wave, the projections 13 are pressure contacted with the surface of the moving body 24 to apply a frictional force to the same.

At this time, an intermediate position on the trough side of the standing wave that is spaced by a half-wavelength from each power transmission projection 13 has no power transmission projection 13 provided thereat. Therefore, even when convexities and concavities exist on the vibrating body 12 and moving body 24, they are kept out of contact with the moving body 24 and apply no frictional force to the moving body 24 in a direction opposite to the advancing direction thereof.

Accordingly, the moving body 24 moves in an arrow-indicated direction by being applied with a unidirectional frictional force from only the power transmission projections 13 alone on the crest side of the standing waves, i.e., makes its rotary movement about the center shaft 22 as illustrated in FIG. 1.

On the other hand, when rotating the moving body in the opposite direction, it is sufficient that as illustrated in FIG. 2B a voltage be applied to the second lead wire 14b.

The divided parts b1 - - - b6 of the piezoelectric element 11 are excited, whereby the vibrating body 12 is curvature vibrated and 3-wavelength standing waves whose phase is different 90° from the above-described standing waves occur. Forward ends of the respective power transmission projections 13 are displaced in a direction opposite to that described above, and as illustrated in FIG. 3(b), when located on the crest side of the standing wave, the projections 13 are pressure contacted with the moving body 24 to apply a frictional force to the same in a direction opposite to that described above. Accordingly, the moving body 24 makes its rotary movement in the opposite direction.

As described above, according to this embodiment, the intermediate position on the trough side of the standing wave that is spaced by a half wavelength from the power transmission projection 13 is made to be kept out of contact with the moving body 24 so as not to apply a frictional force to the moving body 24 in the direction opposite to the advancing direction. Therefore, the loss of the vibration energy of the vibrating body 12 is prevented and the rotation performance of the ultrasonic motor is enhanced.

It is to be noted that in this embodiment the standing-wave mode is not limited to a standing wave consisting of a singular waveform. Namely, from the viewpoint of strengthening the torque of the ultrasonic motor, it may be arranged that, using a composite standing wave wherein a plurality of same-phase standing waves are superimposed one upon another, each power transmission projection 13 is provided at an intermediate position between the loop and node of the composite standing wave every one wavelength.

{Second Embodiment}

FIGS. 4A and 4B each illustrate a main part of a second embodiment to which the present invention has been applied to an ultrasonic motor, FIG. 4A illustrating a planar structure and FIG. 4B thereof illustrating a developed structure of the circumferential surface.

The planar structure and the developed structure of the circumferential surface of this embodiment are substantially the same as in the case of the first embodiment and therefore there are omitted the explanations regarding common portions of this second embodiment that are common to those of the first embodiment. The characterizing respect of this embodiment is that a square-columnar vibration stabilizing projection 15 is provided at the boundary portion between the divided parts of each set (a2 and b2, a4 and b4, and a6 and b6) which have each been polarization processed to the (−) direction.

Figure 3:
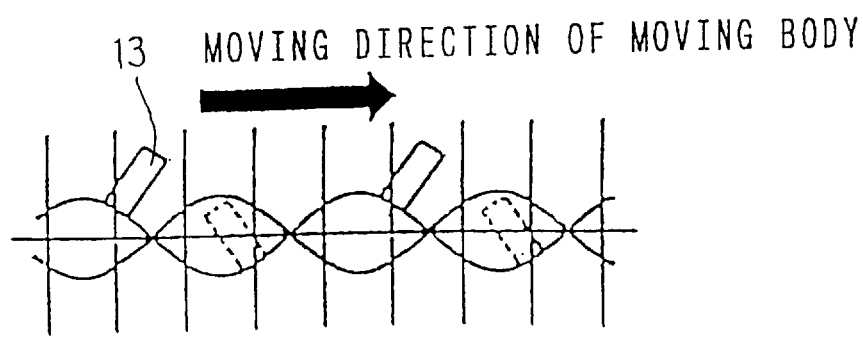
FIGS. 3A and 3B are explanatory views each illustrating the positional relationship between respective power transmission projections, and standing waves occurring on the vibrating body, illustrated in FIG. 1 and the operational principle involved therein.
Figure 3:
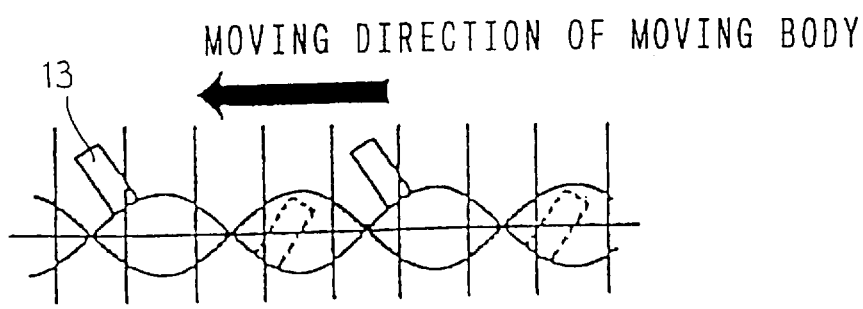
Figure 4:
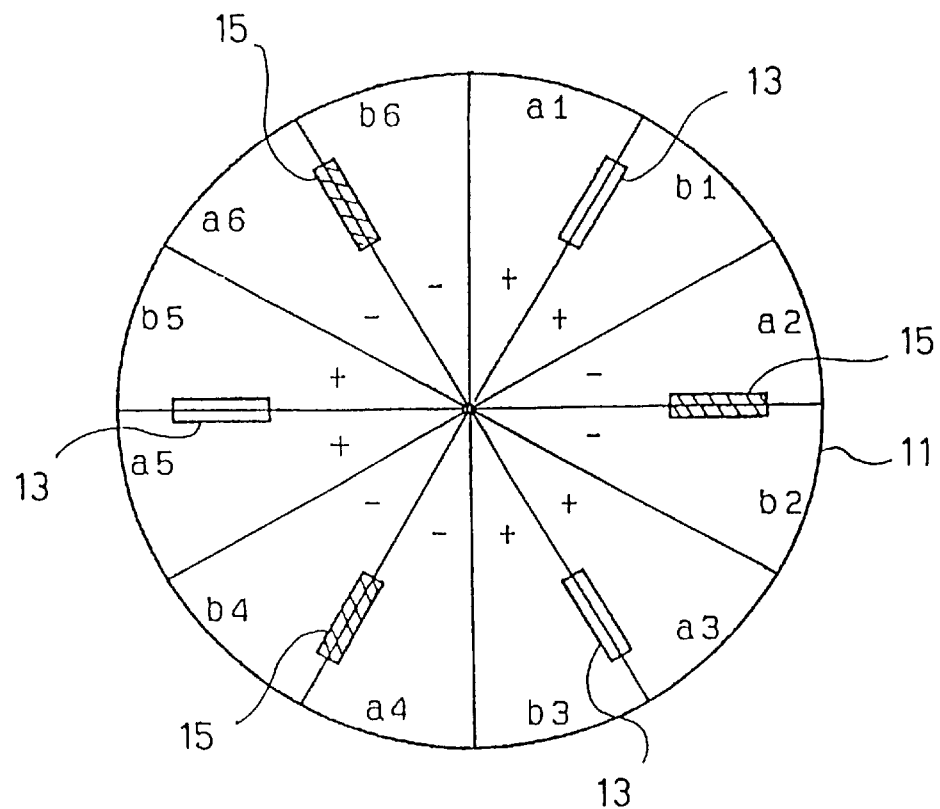
FIG. 4A is an explanatory view illustrating a planar structure of a main part of a second embodiment wherein the present invention has been applied to an ultrasonic motor.
FIG. 4B is an explanatory view illustrating a developed structure of a circumferential surface thereof.
Figure 4:
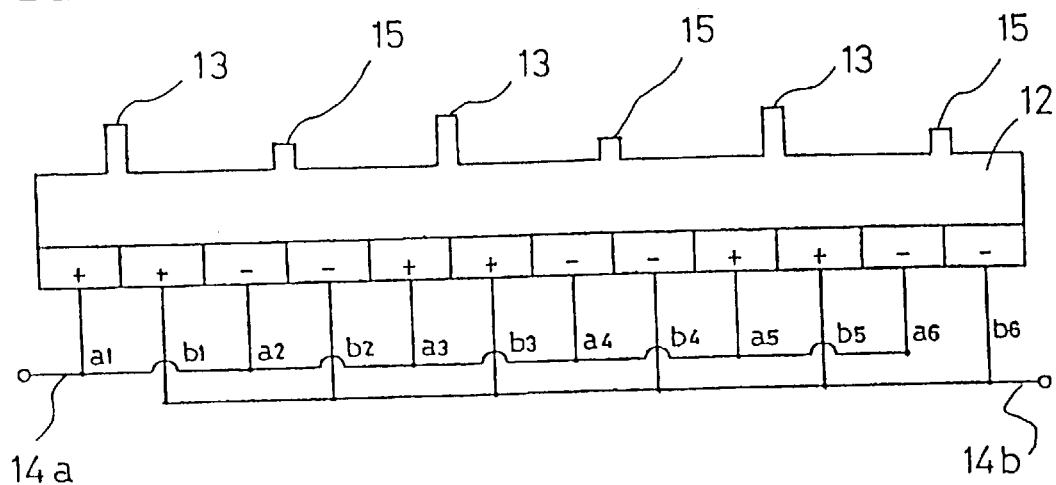
Figure 5:
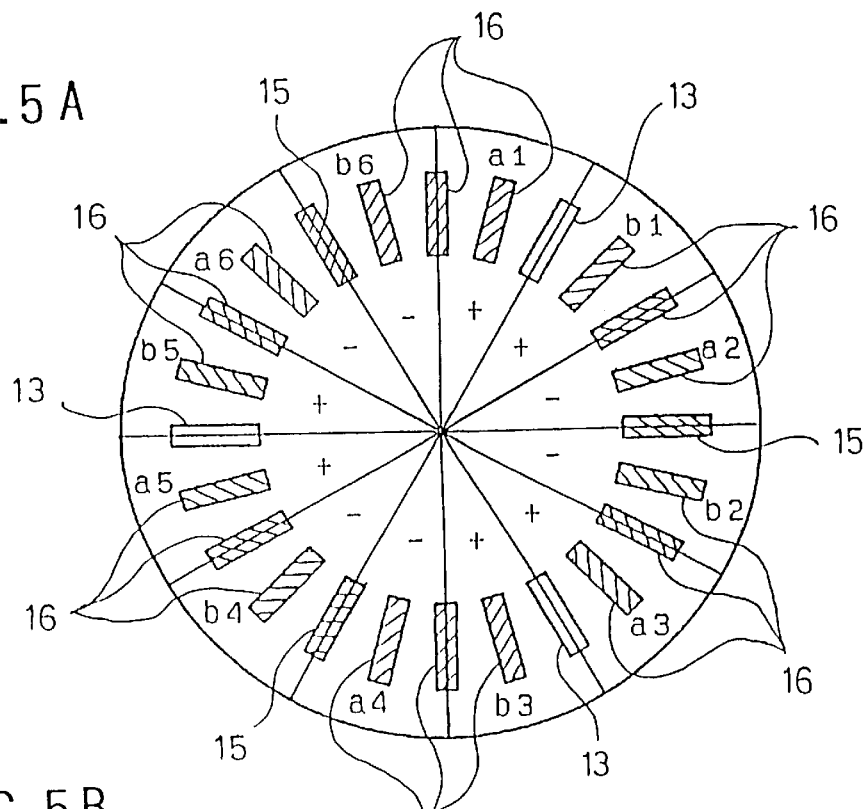
FIG. 5A is an explanatory view illustrating a planar structure of a main part of a third embodiment wherein the present invention has been applied to an ultrasonic motor.
FIG. 5B is an explanatory view illustrating a developed. structure of a circumferential surface thereof.
Figure 5:
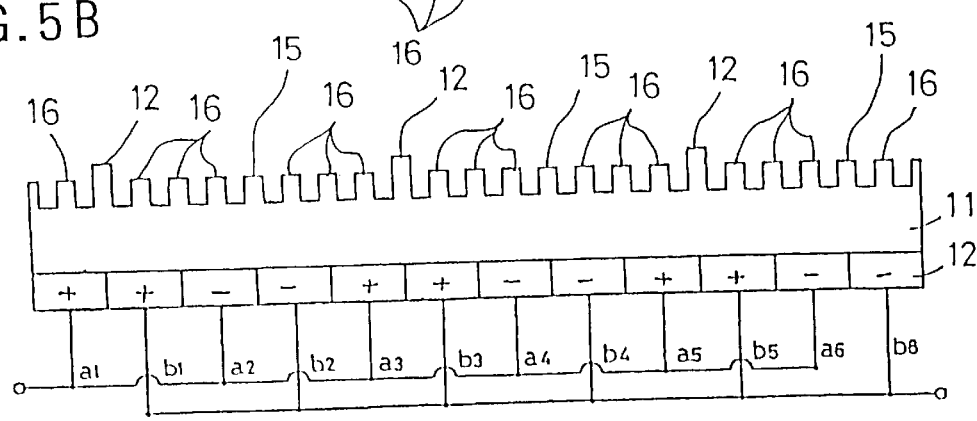
Figure 6:
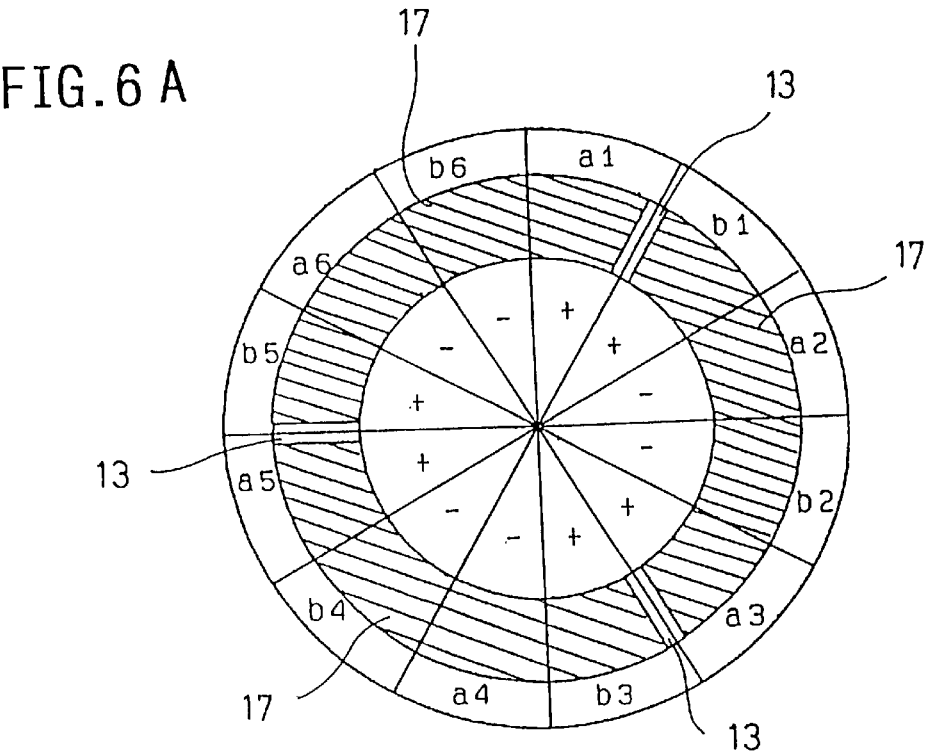
FIG. 6A is an explanatory view illustrating a planar structure of a main part of a fourth embodiment wherein the present invention has been applied to an ultrasonic motor.
FIG. 6B is an explanatory view illustrating a developed structure of a circumferential surface thereof.
Figure 6:
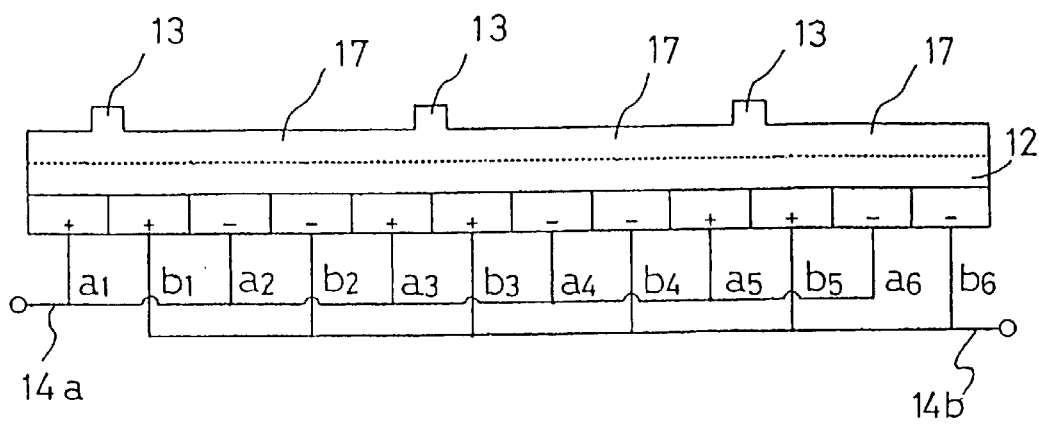

As illustrated in FIG. 3, this vibration stabilizing projection 15 is located at the intermediate position between the loop and node of the standing wave occurring on the vibrating body 12 which is spaced by a half wavelength from each power transmission projection 13, and the projection 15 is located at the position that is equidistant from each adjacent power transmission projection 13.

Also, the height of the projection 15 is smaller than the power transmission projection 13 to such an extent as not to touch on the surface of the moving body 24 even when the projection 15 is located on the trough side of the standing wave, and further the projection 15 is designed so that even when convexities and concavities exist on the surface of the vibrating body 12 or moving body 24, the projection 15 may be kept out of contact with the moving body 24. And it is not necessary that all the projections 15 be same in height.

According to this vibration stabilizing projection 15, it is arranged that its equilibrium with the power transmission projection 13 is achieved so as to maintain the balanced state of the vibrating body 12 on which standing waves are occurring. Therefore, the vibration state of the vibrating body 12 and piezoelectric element 11 is stabilized and also the changes in the vibration characteristic due to the changes in the environment are mitigated. Also, it is arranged that when the projection 15 is located on the trough side of the standing wave, it applies no frictional force in the direction opposite to the advancing direction, and therefore nor is any vibration energy lost. Further, the manufacturing process also is simplified.

{Third Embodiment}

FIGS. 5A and 5B each illustrate a main part of a third embodiment to which the present invention has been applied to an ultrasonic motor, the FIG. 5A illustrating a planar structure and FIG. 5B thereof illustrating a developed structure of the circumferential surface.

The planar structure and the developed structure of the circumferential surface of this embodiment are substantially the same as in the case of the first embodiment and therefore there are omitted the explanations regarding common portions of this third embodiment that are common to those of the first embodiment.

The characterizing respects of this embodiment are that a square-columnar vibration stabilizing projection 15 is provided at the boundary portion between the divided parts of each set (a2 and b2, a4 and b4, and a6 and b6) which have each been polarization processed to the (−) direction and that, in addition, vibration stabilizing projections 16 are provided between the power transmission projection 13 and the vibration stabilizing projection 15 so that the distances between the projections 16 may be equal.

When referring to FIG. 3, these vibration stabilizing projections 15 and 16 are each located between adjacent two of the power transmission projections 13 at every ⅛ wavelength interval.

According to this, the vibration state of the vibrating body 12 and piezoelectric element 11 is further stabilized by the vibration stabilizing projections 16.

{Fourth Embodiment}

FIGS. 6A and 6B each illustrate a main part of a fourth embodiment to which the present invention has been applied to an ultrasonic motor, FIG. 6A illustrating a planar structure and FIG. 6B thereof illustrating a developed structure of the circumferential surface.

The planar structure and the developed structure of the circumferential surface of this embodiment are substantially the same as in the case of the first embodiment and therefore there are omitted the explanations regarding common portions of this fourth embodiment that are common to those of the first embodiment.

The characterizing respect of this embodiment is that strip-like vibration stabilizing projections 17 whose height is lower than that of the power transmission projection 13 are each provided continuously between adjacent two of the power transmission projections 13.

According to this, the configuration is simple compared to the square-columnar vibration transmission projections 15 and 16 in the second and third embodiments and the manufacturing process also is simplified.

{Fifth Embodiment}

Figure 7:
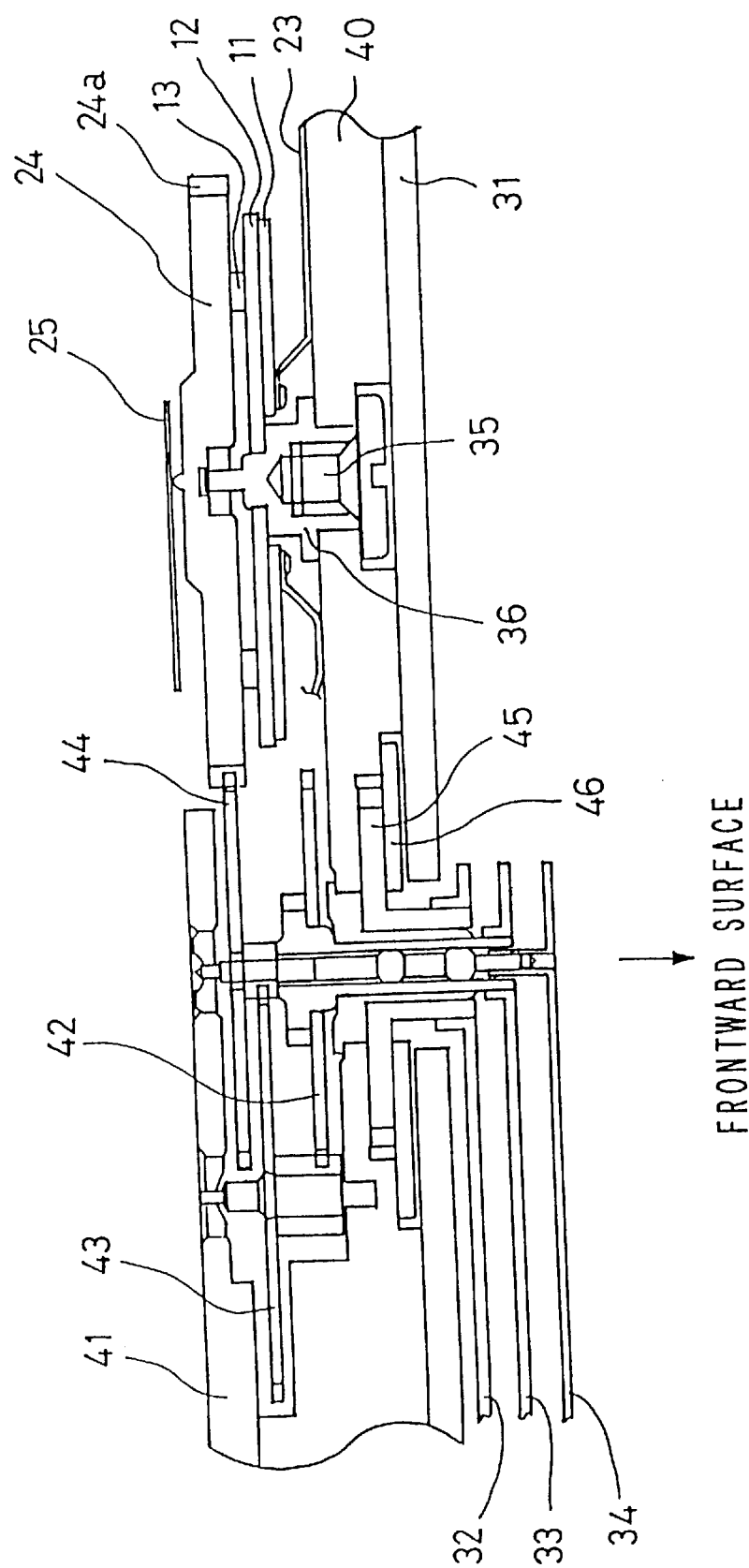
FIG. 7 is an explanatory view illustrating a fifth embodiment wherein an ultrasonic motor according to the present invention has been applied to an analog type timepiece.

FIG. 7 illustrates a sectional structure of a fifth embodiment to which the ultrasonic motor according to the present invention has been applied to an analog type timepiece.

The analog type timepiece is comprised of an ultrasonic motor that is composed of a piezoelectric element 11, a vibrating body 12, power transmission projections 13, a moving body 24 and a pressurizing spring 25, a set screw 35, a guide pin 36, a main plate 40 for pressing the set screw 35, a dial 31 disposed on a frontward surface of the main plate 40, an hour hand 32, minute hand 33 and second hand 34 that are provided on a frontward surface of the dial 31, a fourth wheel & pinion 44 which is meshed with a moving body gear 24a and whose rotating shaft is provided integrally with the second hand 34, a third wheel & pinion 43 that is meshed with the rotating shaft of the fourth wheel & pinion 44, a center wheel & pinion 42 that is meshed with a rotating shaft of the third wheel & pinion 43 and that is providedintegrally with the minute hand 33, an hour wheel 45 that is located frontward from the center wheel & pinion 42 and that is provided integrally with the hour hand 32, a back holder 46 that presses the hour wheel 45 to the back side, and a train wheel bridge 41 that bears respective rotating shafts of the third wheel & pinion 43 and fourth wheel & pinion 44.

Here, the number of the gear teeth of each of the center wheel & pinion 42 and third wheel & pinion 43 is set so that the rotation speed of the minute hand 33 may be 1/60 of the rotation speed of the fourth wheel & pinion 44, i.e. second hand 34, and the gear ratio between the hour wheel 45 and a back wheel (not illustrated) is set so that the rotation speed of the hour hand 32 may be 1/720 of the fourth wheel & pinion 44.

Next, the operation of the analog type timepiece will be explained with reference to FIG. 7.

When rotating the moving body 24, the moving body gear 24a causes the fourth wheel & pinion 44 to rotate with a prescribed rotation speed, whereby the second hand 34 integral with the fourth wheel & pinion 44 is driven to rotate and thereby indicates a second.

The rotation speed of the fourth wheel & pinion 44 is reduced by the third wheel & pinion 43 and minute hand 42, whereby the minute hand 33 integral with the center wheel & pinion 42 is driven to rotate with a rotation speed that is 1/60 of the second hand, thereby indicating a minute.

On the other hand, the rotation speed of the fourth wheel & pinion 44 is reduced by the back wheel (not illustrated) and hour wheel 45, whereby the hour hand 32 integral with the hour wheel 45 is driven to rotate with a rotation speed that is 1/720 of the second hand 34, thereby indicating an hour.

As described above, according to this embodiment, the analog type timepiece that uses the ultrasonic motor is realized.

It is to be noted that the indication of time data is not only made by the plural wheel train and indication hand but may be made by mounting indication hands or indication pointers directly axially of the moving body 24. These indication hands or pointers can be seen from the dial 31 side and from the pressurizing spring 25 side.

Further, by controlling the frequency of a frequency voltage that is applied from a motor driving circuit to the piezoelectric element 11 through the operation of a motor control circuit, the second hand 34 may be driven stepwise every one second or driven continuously. Also, not only the indication of time but also the indication of a calendar such as days, months and year, the residual capacity of a battery, environmental data, a mechanism, etc. may be made.

{Sixth Embodiment}

Figure 8:
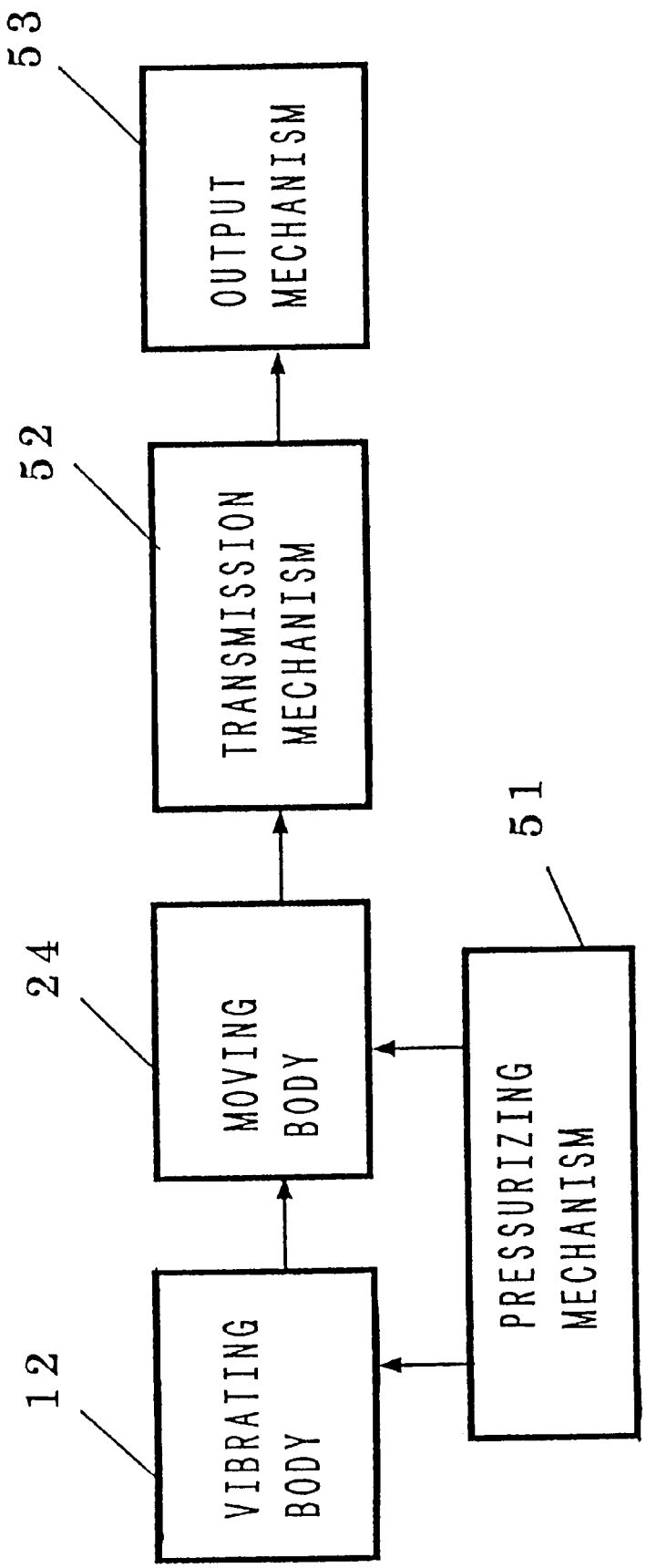
FIG. 8 is an explanatory view which is a block diagram illustrating a sixth embodiment to which the present invention has been applied.
Figure 9B:
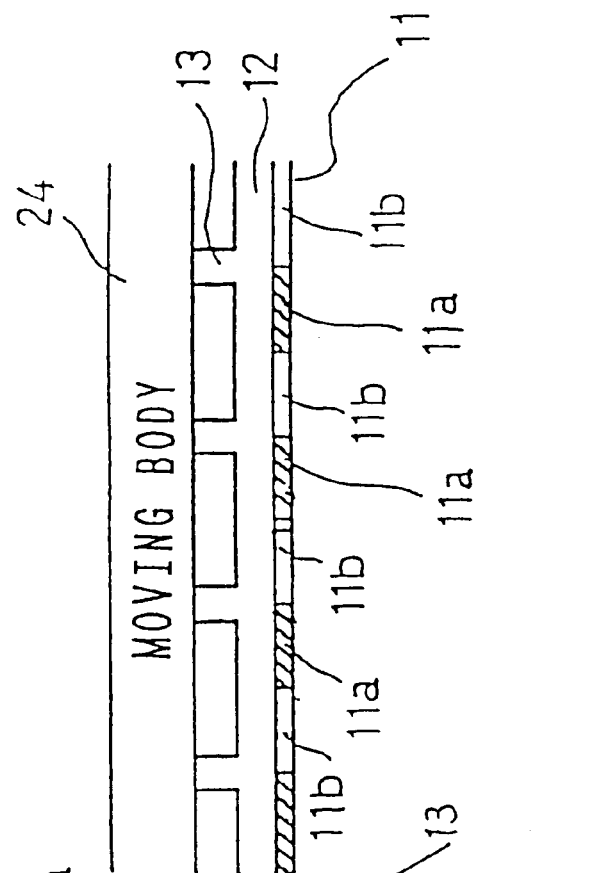
FIG. 9B is an explanatory view illustrating a planar structure of a main part of the ultrasonic motor according to the prior art.
Figure 9A:
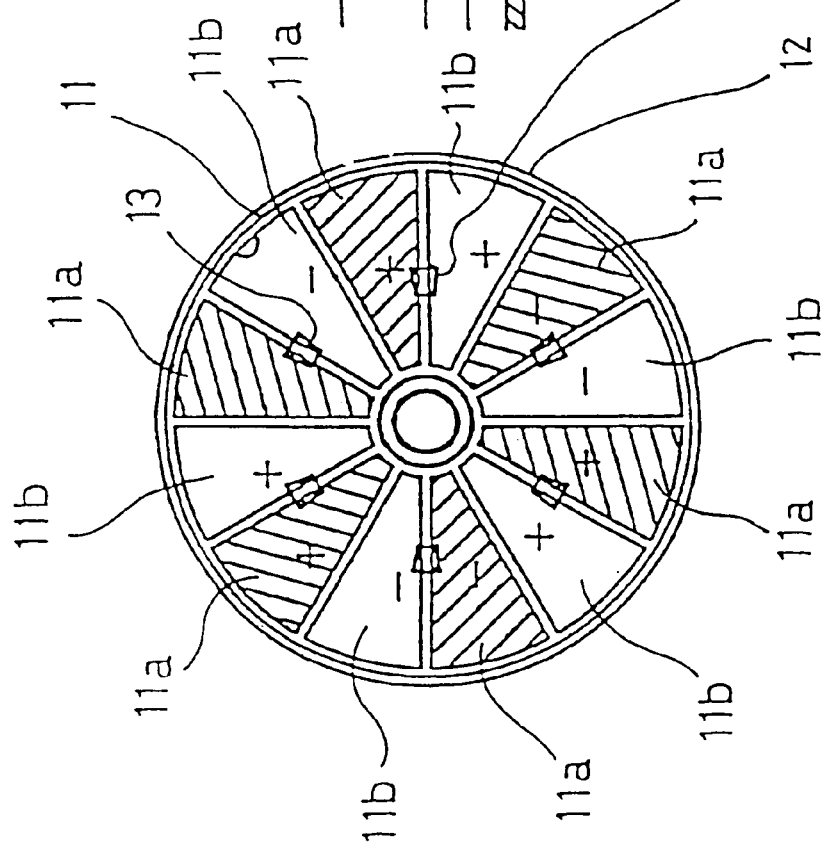
FIG. 9A is an explanatory view illustrating a developed structure of a circumferential surface; of a conventional ultrasonic motor
Figure 10:
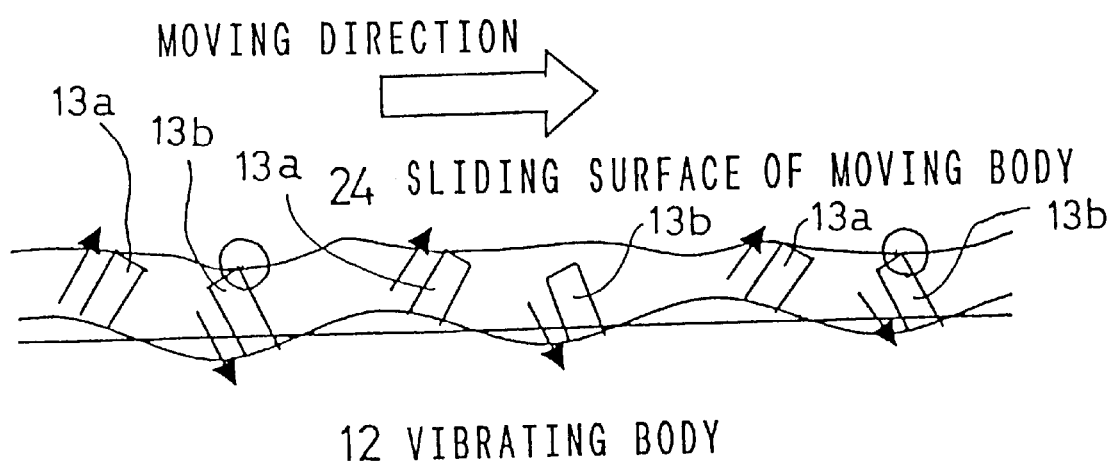
FIG. 10 is an explanatory view illustrating the problem attributed to the disposition of power transmission projections, which arises from the prior art.

FIG. 8 is a block diagram illustrating a sixth embodiment wherein the ultrasonic motor according to the present invention has been applied to an electronic apparatus.

The electronic apparatus is realized by being equipped with the above-described vibrating body 12, the moving body 24 that is moved by the vibrating body 12, a pressurizing mechanism 51 for applying pressure to the moving body 24 and the vibrating body 12, a transmission mechanism 52 movable integrally with the moving body 24 and an output mechanism 53 operating according to the operation of the transmission mechanism 52.

Here, as the transmission mechanism 52 there is used, for example, a transmission wheel such as a gear, friction wheel, etc.

As the output mechanism 53 there are each used, for example, a shutter driving mechanism and lens driving mechanism in the field of cameras, an indication hand driving mechanism and calendar driving mechanism in the field of electronic timepieces, or a blade feeding mechanism and work feeding mechanism in the field of machine tools.

As the electronic apparatus according to the present invention there can be realized, for example, an electronic timepiece, measuring instrument, camera, printer, machine tool, robot, or moving apparatus. Further, if an output shaft is mounted on the moving body and there is made a construction having a power transmission mechanism for transmitting the torque from the output shaft, it is possible to realize a drive mechanism for driving an ultrasonic motor.

What is claimed is:

1. An ultrasonic motor comprising: a piezoelectric element driven by application of a voltage thereto to undergo expansion and contraction; a vibrating body vibrationally driven by the expansion and contraction movement of the piezoelectric element to thereby form standing waves; a moving body frictionally driven by the standing waves of the vibrating body; and a plurality of power transmission projections for applying a frictional force to the moving body to thereby frictionally drive the moving body in accordance with the standing waves, the power transmission projections being disposed only every preselected number of wavelengths at intermediate positions between loops and nodes of the standing waves of the vibrating body, the preselected number being a natural number.

2. An ultrasonic motor as claimed in claim 1; wherein the natural number is 1.

3. An ultrasonic motor as claimed in claim 1 or 2; further comprising a plurality of vibration stabilizing projections for stabilizing the vibration of the vibrating body, the vibration stabilizing projections being equally spaced from each other at respective positions between each adjacent two of the power transmission projections, the vibration stabilizing projections having a height smaller than that of the power transmission projections.

4. An ultrasonic motor as claimed in claim 3; wherein the vibration stabilizing projections are disposed at respective intermediate positions between and equidistant from the power transmission projections.

5. In an electronic apparatus having a transmission mechanism and an output mechanism for producing an output motion, an ultrasonic motor as claimed in claim 4, the transmission mechanism being connected to the moving body of the ultrasonic motor for transmitting the movement of the moving body to the output mechanism to drive the output mechanism to produce the output motion.

6. In an analog timepiece having a transmission mechanism and an indication mechanism for indicating time, an ultrasonic motor as claimed in claim 4, the transmission mechanism being connected to the moving body of the ultrasonic motor for transmitting the movement of the moving body to the indication mechanism to drive the indication mechanism to indicate time.

7. In an electronic apparatus having a transmission mechanism and an output mechanism for producing an output motion, an ultrasonic motor as claimed in claim 3, the transmission mechanism being connected to the moving body of the ultrasonic motor for transmitting the movement of the moving body to the output mechanism to drive the output mechanism to produce the output motion.

8. In an analog timepiece having a transmission mechanism and an indication mechanism for indicating time, an ultrasonic motor as claimed in claim 3, the transmission mechanism being connected to the moving body of the ultrasonic motor for transmitting the movement of the moving body to the indication mechanism to drive the indication mechanism to indicate time.

9. An ultrasonic motor as claimed in claim 1 or 2; wherein the plurality of power transmission projections comprise at least three power transmission projections.

10. In an electronic apparatus having a transmission mechanism and an output mechanism for producing an output motion, an ultrasonic motor as claimed in claim 9, the transmission mechanism being connected to the moving body of the ultrasonic motor for transmitting the movement of the moving body to the output mechanism to drive the output mechanism to produce the output motion.

11. In an analog timepiece having a transmission mechanism and an indication mechanism for indicating time, an ultrasonic motor as claimed in claim 9, the transmission mechanism being connected to the moving body of the ultrasonic motor for transmitting the movement of the moving body to the indication mechanism to drive the indication mechanism to indicate time.

12. An ultrasonic motor as claimed in claim 2; further comprising a plurality of vibration stabilizing projections for stabilizing the vibration of the vibrating body, each of the vibration stabilizing projections being disposed between a respective adjacent pair of the power transmission projections and extending from one of the adjacent power transmission projections to the other.

13. In an electronic apparatus having a transmission mechanism and an output mechanism for producing an output motion, an ultrasonic motor as claimed in claim 2, the transmission mechanism being connected to the moving body of the ultrasonic motor for transmitting the movement of the moving body to the output mechanism to drive the output mechanism to produce the output motion.

14. In an analog timepiece having a transmission mechanism and an indication mechanism for indicating time, an ultrasonic motor as claimed in claim 2, the transmission mechanism being connected to the moving body of the ultrasonic motor for transmitting the movement of the moving body to the indication mechanism to drive the indication mechanism to indicate time.

15. In an electronic apparatus having a transmission mechanism and an output mechanism for producing an output motion, an ultrasonic motor as claimed in claim 2, the transmission mechanism being connected to the moving body of the ultrasonic motor for transmitting the movement of the moving body to the output mechanism to drive the output mechanism to produce the output motion.

16. In an analog timepiece having a transmission mechanism and an indication mechanism for indicating time, an ultrasonic motor as claimed in claim 2, the transmission mechanism being connected to the moving body for transmitting the movement of the moving body to the indication mechanism to drive the indication mechanism to indicate time.

17. An ultrasonic motor as claimed in claim 1; further comprising a plurality of vibration stabilizing projections for stabilizing the vibration of the vibrating body, each of the vibration stabilizing projections being disposed between a respective adjacent pair of the power transmission projections and extending from one of the adjacent power transmission projections to the other.

18. In an analog timepiece having a transmission mechanism and an indication mechanism for indicating time, an ultrasonic motor as claimed in claim 2, the transmission mechanism being connected to the moving body of the ultrasonic motor for transmitting the movement of the moving body to the indication mechanism to drive the indication mechanism to indicate time.

19. An ultrasonic motor comprising: a piezoelectric element driven by application of a voltage thereto to undergo expansion and contraction; a vibrating body vibrationally driven by the expansion and contraction of the piezoelectric element to generate standing waves, the vibrating body having a plurality of power transmission projections disposed only every preselected number of wavelengths at intermediate positions between loops and nodes of the standing waves, the preselected number being a natural number; a movable body disposed on the vibrating body in contact with the projections so as to be frictionally driven by the standing waves generated by expansion and contraction of the piezoelectric element; and a pressure member for urging the movable body into pressure contact with the vibrating body.

20. An ultrasonic motor as claimed in claim 19; wherein the natural number is 1.

21. An ultrasonic motor as claimed in claim 19; further comprising a plurality of vibration stabilizing projections for stabilizing the vibration of the vibrating body, the vibration stabilizing projections being equally spaced from each other at respective positions between each adjacent pair of the power transmission projections.

22. An ultrasonic motor as claimed in claim 21; wherein the vibration stabilizing projections have a height smaller than that of the power transmission projections.

23. An ultrasonic motor as claimed in claim 21 or 22; wherein the vibration stabilizing projections are disposed at respective intermediate positions between and equidistant from the power transmission projections.

24. An ultrasonic motor as claimed in claim 19; wherein the plurality of power transmission projections comprise at least three power transmission projections.

25. An ultrasonic motor as claimed in claim 19; further comprising a plurality of vibration stabilizing projections for stabilizing the vibration of the vibrating body, each of the vibration stabilizing projections being disposed between a respective adjacent pair of the power transmission projections and extending from one of the adjacent power transmission projections to the other.

26. In an electronic apparatus having a transmission mechanism and an output mechanism for producing an output motion, an ultrasonic motor as claimed in claim 19, the transmission mechanism being connected to the moving body of the ultrasonic motor for transmitting the movement of the moving body to the output mechanism to drive the output mechanism to produce the output motion.

\* \* \* \* \*